Dec. 21, 1937.  M. HELFENSTEIN ET AL  2,103,006
PROTECTIVE SHIELD FOR ELECTRICAL WELDERS
Filed March 10, 1936   2 Sheets-Sheet 1

Inventors:
Max Helfenstein
Felix Max Hirzig
By Arthur M. Hahn ATTY

Dec. 21, 1937.  M. HELFENSTEIN ET AL  2,103,006
PROTECTIVE SHIELD FOR ELECTRICAL WELDERS
Filed March 10, 1936  2 Sheets-Sheet 2

Inventors:

Patented Dec. 21, 1937

2,103,006

UNITED STATES PATENT OFFICE 2,103,006

PROTECTIVE SHIELD FOR ELECTRICAL WELDERS

Max Helfenstein and Felix Max Hirsig, Lucerne, Switzerland

Application March 10, 1936, Serial No. 68,010
In Germany July 26, 1935

5 Claims. (Cl. 2—8)

Our invention relates to improvements in protective shields as used for preventing damages to the welder's eyes and skin due to the action of radiations emitted from electrical arcs or other sources of light as well as for keeping off heat-radiations developed to a considerable degree at such work; and the objects of our improvement are, first, to provide for the requirements of accident-prevention as well as for those of economy; and, second, to combine the most simple handling imaginable with a light weight of shield.

We obtain these objects by fastening the protective pane, through which the action of welding is observed, in the shape of a narrow rectangular strip immovably in a shield and adapting the latter, with relation to a cap fastened to the welder's head, adjustably in such a way that it may be raised or lowered according to the position of the workpiece and with the welding operation being interrupted, be rotated about the welder's head. In order then to well define the position of the shield at every adjustment and to sufficiently fix it without making use of a counterweight we have introduced a special guide-mechanism adapted in such a way as to allow one to bring the shield onto an elevation which is most favorable for observing the welding operation. We have attained the accurate balancing of weight, necessary for fixing the shield at a certain elevation, through the use of springs.

Our design of shield thus is characterized by positively steering the motion of the face-screen in such a way that the latter first describes a rotation about a fixed axis and that, secondly, with said motion having come to an end, the adjustment of the face-screen being steered by two guides so as to adapt the inclination of said screen, containing the protective pane, to the direction of view at each elevation.

The purely rotatory motion may e. g. be sufficiently fixed in its terminal positions by means of a stretched spring so as to prevent any undesired movement of the shield out of said terminal position.

The weight of the face-screen and of the guides to which it is fastened may e. g. be counterbalanced by means of springs attached to each guide in such a way that special means of fixation—such as a clamping fast of the guides, which would impair the easy adjustability of the screen and perhaps result in a shifting of the leather-cap—may be dispensed with.

Having now explicitly laid down the general principles of our type of shield we shall implicitly refer to the nature of our invention by means of the accompanying drawings, in which—

Figure 2:
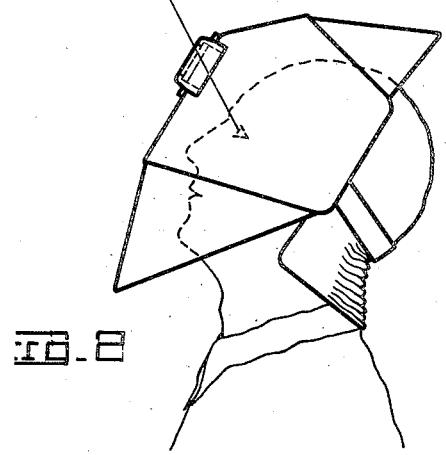
Fig. 2 is a similar view and showing the adjustment of the shield for work in its highest position.
Figure 3:
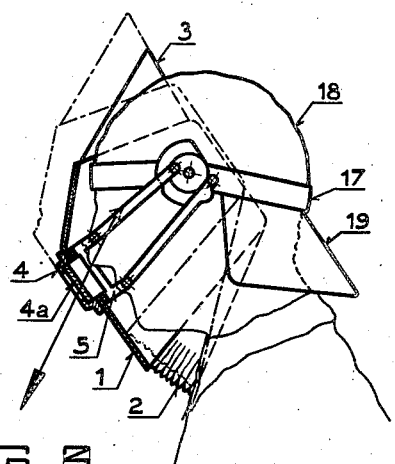
Fig. 3 is a similar view and showing the adjustment of the shield in its lowest position, whereby the shield is intersected by a plane laid through the eye of the person represented, and the mechanism of the guides and the cap in elevation.
Figure 5:
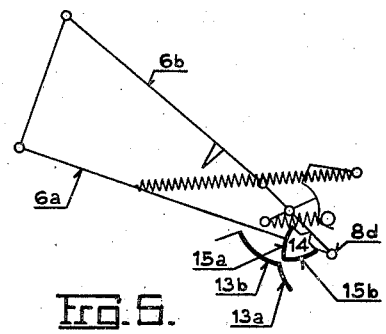
Figure 6:
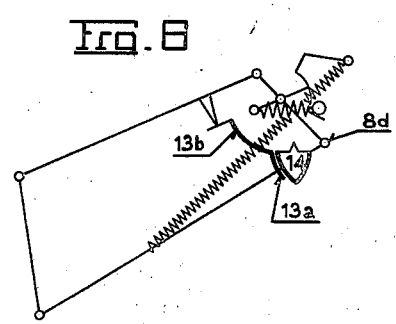
Figure 7:
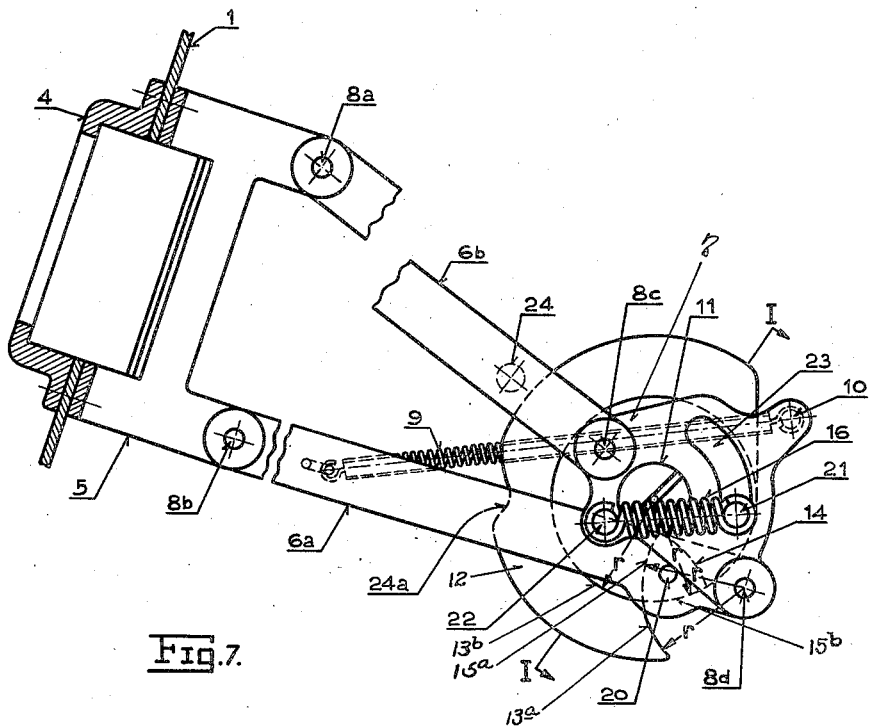
Figure 8:
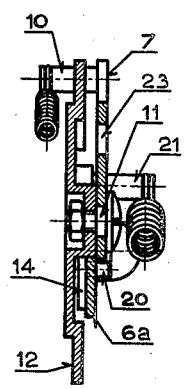
Figure 9:
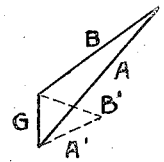
Figure 10:
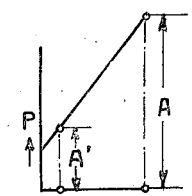

Fig. 5 also is a schematic illustration of the guide-mechanism with the position of the guides corresponding to the adjustment of the shield according to Fig. 2;

Fig. 6 also is a diagram of the guide-mechanism, whereby the position of the guides corresponds to the adjustment of the shield according to Fig. 3;

Fig. 7 is a side elevation of the guide-mechanism as viewed from the interior side of the shield;

Fig. 8 is a transverse section through the guide-mechanism along line I—I of Fig. 7; and Figs. 9 and 10 are diagrammatic views illustrating the forces and spring-tensions for the positions shown in Figs. 5 and 6 respectively.

The illustrated protective screen contains a face-screen 1 of well-known design and made of a heat-insulating material, said screen being supplemented at its lower end by a foldable screen 2, removable if so desired, made of cloth or leather and at its upper end by a similar screen 3. Screen 1 contains a window frame 4 with a protective pane 4a. The shield is fastened to the frame of the face screen 1 by means of a metallic fitting 5 (Figs. 3 and 7). Straps 6a and 6b connect the movable shield to the stationary head-dress in the following manner:

A head-band 17, with a neck-protecting leather 19, is fastened to the cap 18. Said head-band carries at both ends a plate 12 on which a plate 7 is revolvably mounted by means of pivot 11. To said plate 7 straps 6a and 6b are revolvably fastened by means of pivots 8c and 8d at one end and to the metallic fitting 5 at the other end by means of pivots 8a and 8b.

Straps 6a and 6b are adapted in such a way as to obtain, when adjusting the shield, the most favorable inclination of the latter relative to the direction of view. Suppose now that the shield were revolvable about but a single axis, the window 4 then, at the same inclination of the shield, would occupy the position as shown by dotted lines in Fig. 3, i. e. the field of view would be decreased for an amount of about 40%. Weight-balancing springs 9 are fastened to the two straps 6a, and the abutments 10 of said springs, located on plates 7 are so arranged and the springs are so dimensioned (Fig. 10) as to have, at any position of the shield, the apparent forces—gravity and tension of spring—counterbalanced (Fig. 9).

Straps 6a and 6b are adapted in such a way as to rotate about pivots 8c and 8d to an extent limited by stop-pin 24 in association with recess 24a, and the rotative motion of plate 7 about pivot 11 fastened to plate 12 also is limited by means of pin 21 fastened to plate 12 and by the ends of the elongated hole 23 in plate 7. The first mentioned motion effects the adjustment of the shield according to the position of the weld and the latter motion serves for raising the shield during interruptions in the welding operation. The straps 6a each carry a cam 14 securely fastened to it, the frontal faces 15a and 15b of which with a radius of curvature $r$ are positively led to follow a movement by corresponding guides 13a and 13b in plate 12 of the same radius of curvature; said movement to be effected in such a way that, with stop-pin 20 abutting against plate 7, either only a rotatory motion of plate 7 about pivot 11 or only a rotatory motion of straps 6a and 6b about pivots 8c and 8d is possible. Cam 14 and guide-faces 13a and 13b furthermore must serve for ascertaining a certain succession for said individual rotatory motions. At the start of the rotation of straps 6a and 6b about pivots 8c and 8d the rotation of plate 7 about pivot 11 is blocked. Vice-versa, the further rotation of straps 6a and 6b becomes impossible as soon as cam 14 is setting free the rotation of plate 7. Through this steering of the motion the balancing of the weight of the shield in its working position is very much facilitated. This balancing of weight, however, plays a very important part on account of the different elevations to be occupied by the shield relative to the position of the weld, lest we require a strong friction for fixing said elevation and thus impairing the ease of adjustment to such a degree that the cap would be shifted on top of the welder's head.

Figure 1:
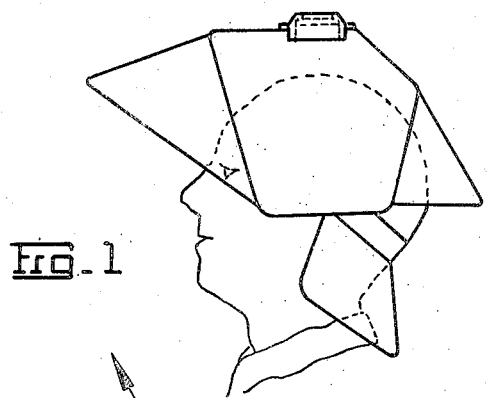
Fig. 1 is a side elevation of the shield turned above the welder's head.
Figure 4:
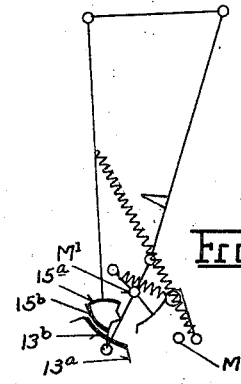
Fig. 4 is a schematic representation of the guide-mechanism, whereby the position of the guides corresponds to the adjustment of the shield according to Fig. 1.

A further advantage of this steered motion is the possibility of arresting the shield in certain positions, e. g. swung fully upward (Fig. 1). It must, however, not occur that the shield, after having taken the position according to Fig. 5, snaps back into either of the final positions (Figs. 1 and 4) when merely being touched. By means of a second spring 16, fastened at one side to plate 7 by way of pin 22 and on the other side to plate 12 by way of pin 21 and hole 23, we attain a fixing of the two final positions of the plate 7, whereby the spring in both terminal positions (Figs. 1 and 2) is subjected to a certain minimum tension.

We claim:

1. A protective shield for welders comprising a cap adapted to fit on the welder's head, a shield pivotally mounted on said cap and having a window therein, said shield being pivoted to said cap on each side through a pair of links each of which is pivoted at its inner end to said cap and at its outer end to said shield, and spring means for counterbalancing the weight of said shield whereby the shield will be freely movable but remain in any adjusted position.

2. A protective shield for welders comprising a cap adapted to fit on the welder's head, a shield pivotally mounted on said cap and having a window therein, said cap having a supporting plate fastened to each side thereof, a second plate rotatably mounted on said supporting plate, a pair of links on each side of said cap interconnecting said shield and said second plate, said links each being pivoted at its outer end to said shield and at its inner end to said second plate, and spring means for counterbalancing the weight of said shield whereby the shield will be freely movable but remain in any adjusted position.

3. A protective shield for welders comprising a cap adapted to fit on the welder's head, a shield pivotally mounted on said cap and having a window therein, said cap having a supporting plate fastened to each side thereof, a second plate rotatably mounted on said supporting plate, a pair of links on each side of said cap interconnecting said shield and said second plate, said links each being pivoted at its outer end to said shield and at its inner end to said second plate, cam means associated with said plates and links to guide said shield during pivotal movement and provide maximum view through said window for the welder at all positions of adjustment of said shield, and spring means for counterbalancing the weight of said shield whereby the shield will be freely movable but remain in any adjusted position.

4. A protective shield for welders comprising a cap adapted to fit on the welder's head, a shield pivotally mounted on said cap and having a window therein, said cap having a supporting plate fastened to each side thereof, a second plate rotatably mounted on said supporting plate, a pair of links on each side of said cap interconnecting said shield and said second plate, said links each being pivoted at its outer end to said shield and at its inner end to said second plate, and spring means for counterbalancing the weight of said shield whereby the shield may be moved from inoperative position above the welder's head to working position solely by movement of the welder's head.

5. A protective shield for welders comprising a cap adapted to fit on the welder's head, a shield pivotally mounted on said cap and having a window therein, said cap having a supporting plate fastened to each side thereof, a second plate rotatably mounted on said supporting plate, a pair of links on each side of said cap interconnecting said shield and said second plate, said links each being pivoted at its outer end to said shield and at its inner end to said second plate, said shield being adjustable about a horizontal axis when in protective position on the welder thereby to provide maximum vision through said window, and also movable to inoperative position above the welder's head, cam means associated with said plates and links to guide said shield during movement about the horizontal axis, additional cam means for guiding said shield when raised above the welder's head, and spring means for counterbalancing the weight of said shield whereby the shield will be freely movable but remain in any adjusted position.

MAX HELFENSTEIN.
FELIX MAX HIRSIG.